(12) United States Patent
Nelson et al.

(10) Patent No.: US 10,875,562 B2
(45) Date of Patent: Dec. 29, 2020

(54) TOOL CART

(71) Applicant: Encore Packaging LLC, Vernon Hills, IL (US)

(72) Inventors: Timothy H. Nelson, Winnetka, IL (US); Stephenson Nelson, Winnetka, IL (US)

(73) Assignee: ENCORE PACKAGING LLC, Vernon Hills, IL (US)

( * ) Notice: Subject to any disclaimer, the term of this patent is extended or adjusted under 35 U.S.C. 154(b) by 0 days.

(21) Appl. No.: 16/432,312

(22) Filed: Jun. 5, 2019

(65) Prior Publication Data

US 2019/0367066 A1 Dec. 5, 2019

Related U.S. Application Data

(60) Provisional application No. 62/680,920, filed on Jun. 5, 2018, provisional application No. 62/745,607, filed on Oct. 15, 2018.

(51) Int. Cl.
| | |
|---|---|
| *B62B 3/04* | (2006.01) |
| *B62B 3/02* | (2006.01) |
| *B65H 49/20* | (2006.01) |
| *B25H 3/00* | (2006.01) |
| *H01R 43/048* | (2006.01) |
| *B25B 27/02* | (2006.01) |

(52) U.S. Cl.
CPC ............... *B62B 3/04* (2013.01); *B25H 3/00* (2013.01); *B62B 3/02* (2013.01); *B65H 49/205* (2013.01); *B25B 27/02* (2013.01); *B62B 2202/48* (2013.01); *B62B 2203/02* (2013.01); *B65H 2402/30* (2013.01); *H01R 43/048* (2013.01)

(58) Field of Classification Search
CPC .... B62B 3/02; B62B 3/04; B25H 3/00; B65H 49/205
See application file for complete search history.

(56) References Cited

U.S. PATENT DOCUMENTS

| | | | | |
|---|---|---|---|---|
| 1,146,077 A | * | 7/1915 | Juergens | B62B 3/02 |
| | | | | 280/43.16 |
| 2,534,868 A | * | 12/1950 | Johnston | B62B 3/04 |
| | | | | 414/491 |
| 2,657,938 A | * | 11/1953 | Browne | A01B 73/00 |
| | | | | 280/62 |
| 2,702,139 A | * | 2/1955 | Faustine | B66C 19/02 |
| | | | | 414/461 |
| 2,780,474 A | * | 2/1957 | Farah | B62B 3/02 |
| | | | | 280/641 |
| 4,564,152 A | * | 1/1986 | Herriage | B65H 49/32 |
| | | | | 242/422.4 |
| 4,669,703 A | * | 6/1987 | Hawkins | B66C 23/48 |
| | | | | 254/124 |

(Continued)

OTHER PUBLICATIONS

YBICO Tool Balancer Dispenser Summary; available as early as Oct. 3, 2018; 2 pages.

(Continued)

*Primary Examiner* — Erez Gurari
(74) *Attorney, Agent, or Firm* — Fitch, Even, Tabin & Flannery LLP (57) ABSTRACT

A cart comprising a support frame having a plurality of wheels, a reel supported by the support frame, and a tool tethered to the support frame.

33 Claims, 10 Drawing Sheets

(56) References Cited

U.S. PATENT DOCUMENTS

| | | | | |
|---|---|---|---|---|
| 4,740,131 | A * | 4/1988 | Mayle | B62B 3/04 212/324 |
| 6,116,533 | A * | 9/2000 | Elder | B65H 49/325 242/557 |
| 6,523,776 | B1 * | 2/2003 | Elder | B65H 49/32 211/85.5 |
| 10,272,935 | B1 * | 4/2019 | Jordan | B62B 1/008 |
| 10,513,411 | B2 * | 12/2019 | Yu Chen | B65B 13/185 |
| 2002/0030336 | A1 * | 3/2002 | Bootsman | B25H 3/00 280/47.19 |
| 2002/0171998 | A1 * | 11/2002 | Brennan, Jr. | B25H 3/00 361/501 |
| 2004/0217578 | A1 * | 11/2004 | Sawyer | B62D 63/061 280/656 |
| 2005/0081898 | A1 * | 4/2005 | Williams | B62B 3/02 134/172 |
| 2006/0038053 | A1 * | 2/2006 | Giovannoni | B65H 49/321 242/557 |
| 2009/0071771 | A1 * | 3/2009 | Yu Chen | F16D 51/00 188/74 |
| 2009/0224498 | A1 * | 9/2009 | Diedericks | B62B 3/10 280/79.6 |
| 2010/0013177 | A1 * | 1/2010 | Horn, Jr. | F04B 35/06 280/47.24 |
| 2014/0077477 | A1 * | 3/2014 | Hronyetz | B62B 3/06 280/659 |
| 2014/0145408 | A1 * | 5/2014 | Midas | B62B 3/0606 280/47.131 |
| 2014/0263526 | A1 * | 9/2014 | Yu Chen | B26D 1/185 225/39 |
| 2015/0054240 | A1 * | 2/2015 | Yu Chen | B62B 3/10 280/47.11 |
| 2016/0263740 | A1 * | 9/2016 | Sackfield | B65D 85/08 |
| 2016/0288150 | A1 * | 10/2016 | Song | B05B 13/005 |
| 2017/0144685 | A1 * | 5/2017 | McVay | B65H 75/22 |
| 2017/0197802 | A1 * | 7/2017 | Yu Chen | B65H 49/321 |
| 2017/0203937 | A1 * | 7/2017 | Yu Chen | B65H 59/04 |
| 2017/0305452 | A1 * | 10/2017 | King | B62B 1/12 |
| 2019/0367066 | A1 * | 12/2019 | Nelson | B25H 3/00 |

OTHER PUBLICATIONS

Encore Eclipser Operating Manual; available as early as Nov. 1, 2016; 6 pages.

* cited by examiner

TOOL CART

CROSS-REFERENCE TO RELATED APPLICATIONS

This application claims the benefit of U.S. Provisional Application No. 62/680,920, filed Jun. 5, 2018, and U.S. Provisional Application No. 62/745,607, filed Oct. 15, 2018, which are hereby incorporated by reference in their entirety.

TECHNICAL FIELD

The invention relates generally to the packaging industry and, more specifically, to a cart having tools to secure strapping around a secured object.

BACKGROUND

Strapping is used to secure objects. For example, strapping is used to secure an object to a pallet for shipping. The strapping is typically a flat metal or plastic strap less than an inch wide. A tensioner is used to tighten the strapping around the object. Different types of tensioners are known, including hand tensioners, pneumatic tensioners, and electric tensioners. Electric tensioners include both corded tensioners and battery powered tensioners.

Metal seals, both smooth and serrated, are known and used for securing the strapping around the object. The seal is typically a metal seal that is crimped around two ends of the strap, in effect tying the two ends together in securing the strap to an object. A common metal seal includes a main body having a width sized to receive the strapping's width. The seal also includes two flanges extending from the main body. A crimping tool pinches the flanges toward the strapping and main body to lock the strapping within the thusly closed seal. Different types of crimping tools are known, including hand crimping tools, pneumatic crimping tools, and electric crimping tools. Electric crimping tools include corded crimping tools and battery powered crimping tools.

In operation, objects are often brought to specific packing areas for the application of strapping. For example, when pneumatic tools are used, the object is brought to a location with an air compressor or air hose for operating the pneumatic tools. Alternatively, the tools and strapping are portable and are brought to the object to be strapped. However, the loose tools are frequently misplaced increasing the amount of time required to prepare an object for shipping as the loose tools are located.

SUMMARY

Generally speaking and pursuant to these various embodiments, a tool cart that includes one or more of a variety of modifications to facilitate an improved rate of preparing objects for shipping. One such modification includes supporting a reel of strapping with the cart. The cart further supports at least one strapping tool, such as a tensioner and/or a crimper. The at least one strapping tool is tethered to the cart so as to be movable during use.

These and other benefits may become clearer upon making a thorough review and study of the following detailed description.

BRIEF DESCRIPTION OF THE DRAWINGS

The above needs are at least partially met through provision of a cart described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1A:
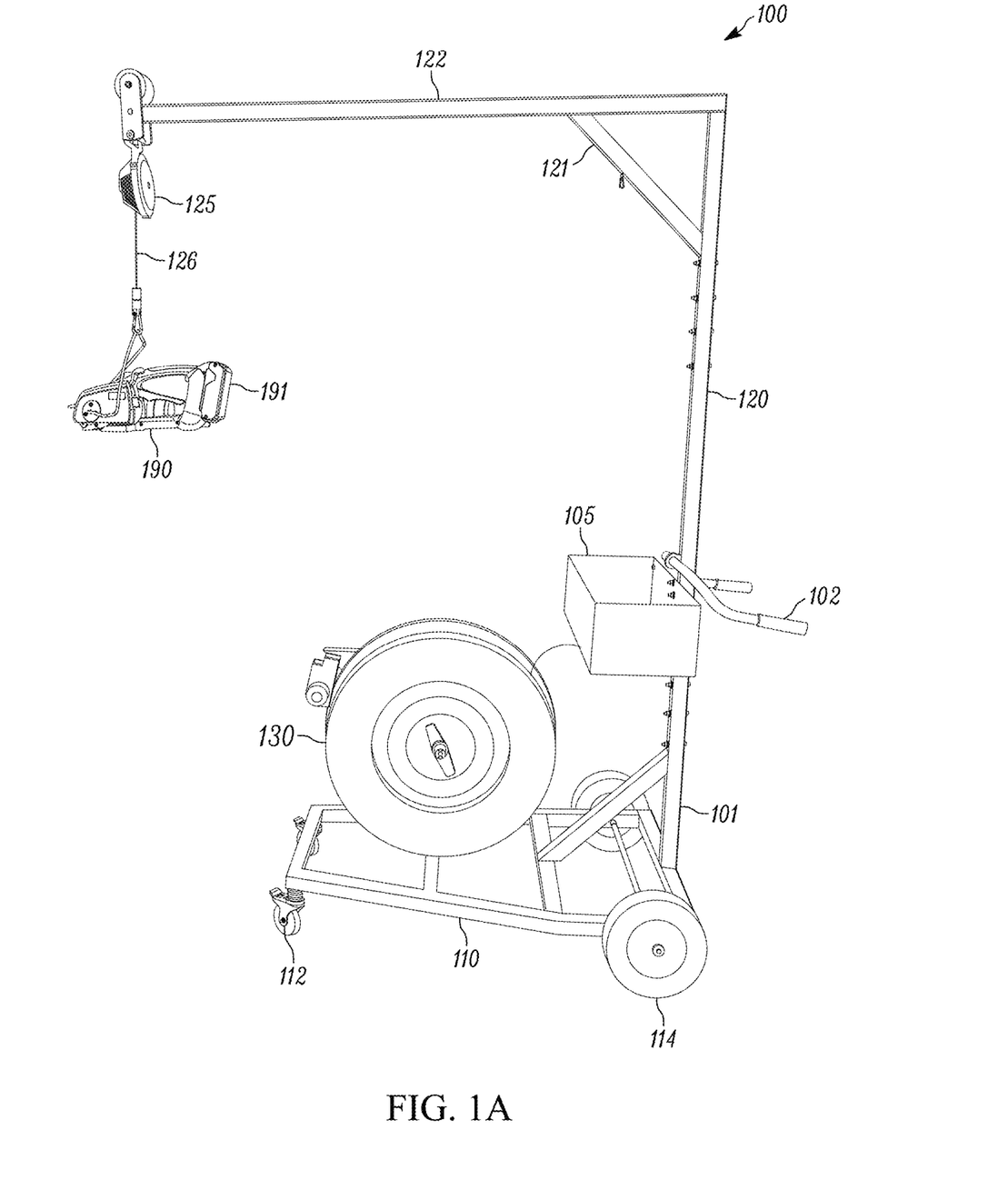
FIG. 1A comprises a side elevational view of a cart with a reel of strapping and a tethered strapping tool in accordance with various embodiments of the invention.
Figure 1B:
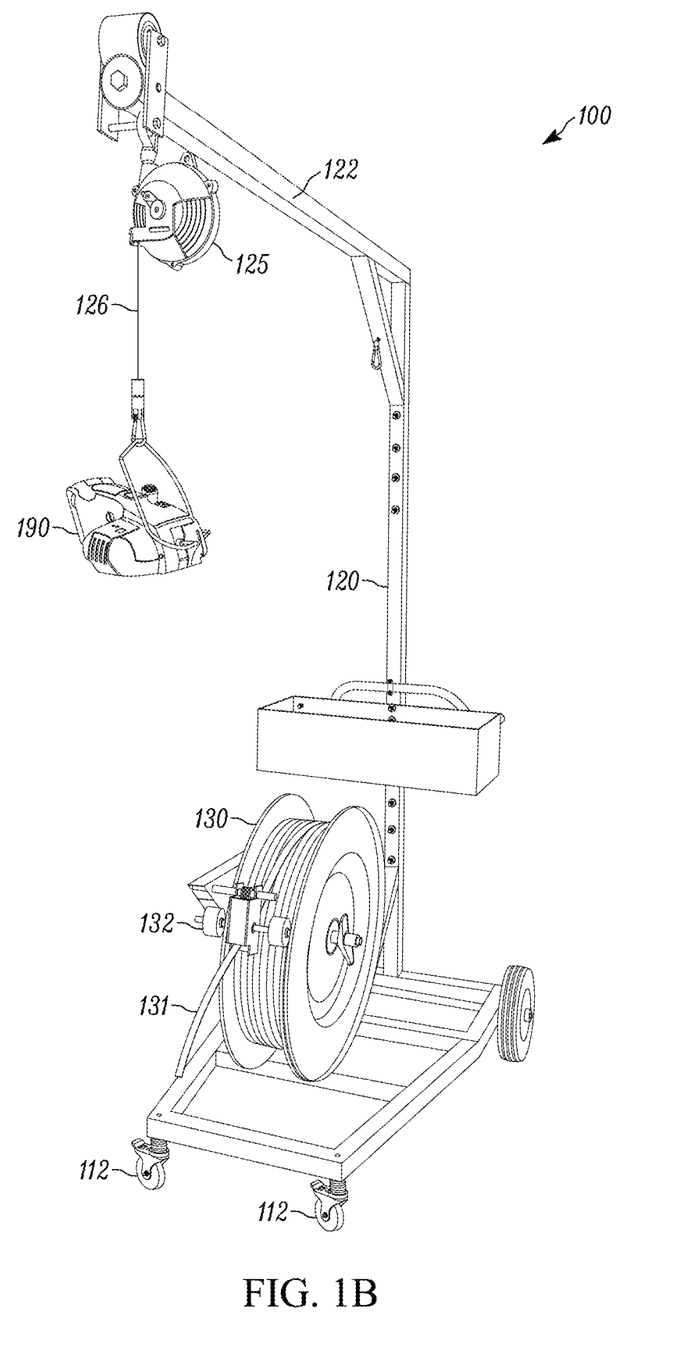
FIG. 1B comprises a front perspective view of the cart of FIG. 1A.
Figure 1C:
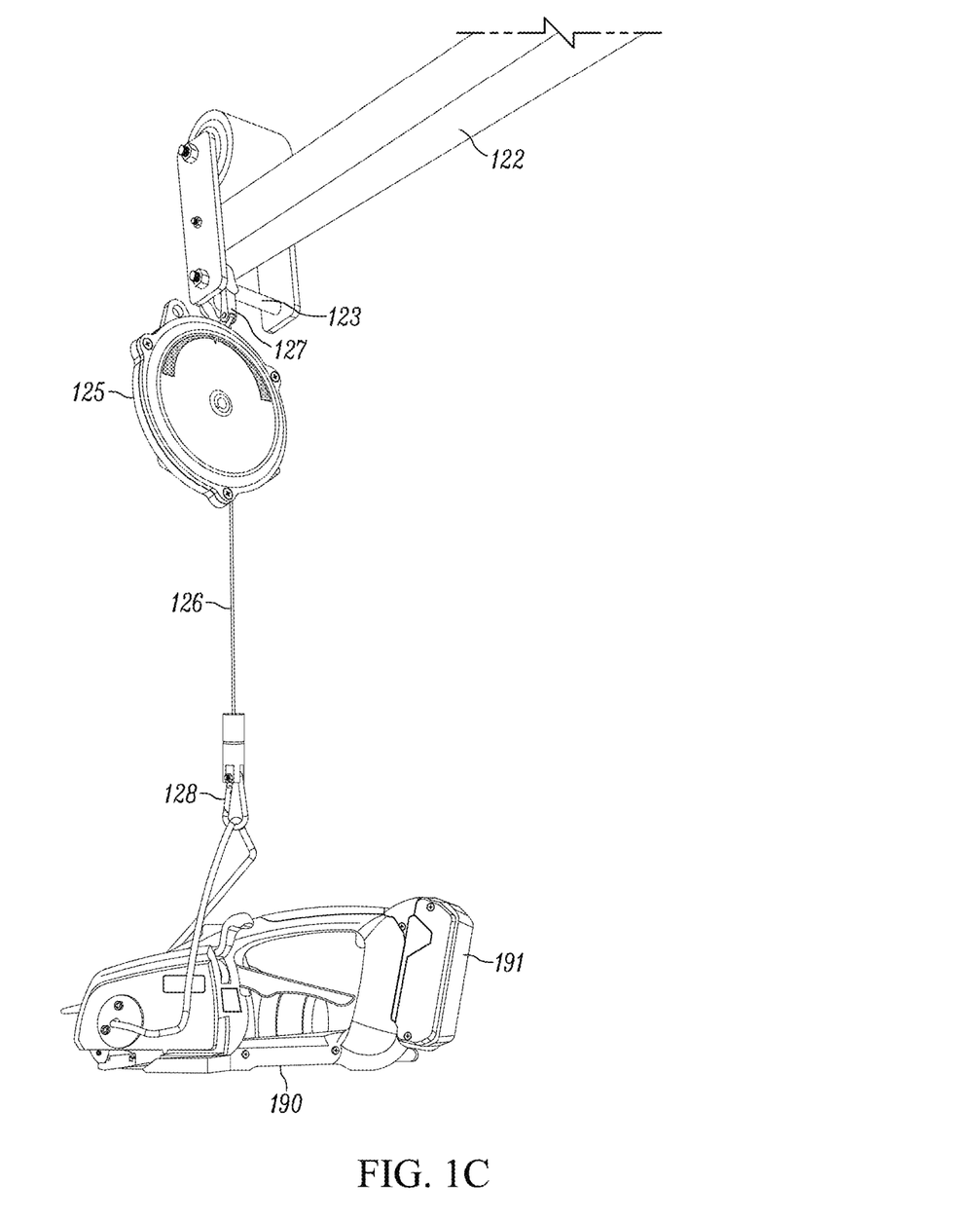
FIG. 1C comprises an expanded view of the tethered strapping tool of FIGS. 1A-1B.

Referring now to the drawings and, in particular FIGS. 1A-1C and exemplary tool cart for strapping applications will be described. The cart 100 has a support frame 101 having a base portion 110 and upright portion 120. The base portion has one or more fixed wheels 114 and one or more swiveling wheels or swivel casters 112. The upright portion 120 supports one or more handles 102 by which the cart 100 can be pushed or pulled to roll on the wheels 112/114.

The base portion 110 supports a reel 130 of strapping 131. The strapping 131 can be metal strapping or plastic strapping (such as polypropylene strapping). In some forms, the reel 130 is detachably coupled to base 110. Detaching the reel 130 from the base 110 allows an empty reel 130 to be replaced with a full reel 130. In some forms, the strapping 131 passes through a guide 132 as it leaves the reel 130. The guide 132 includes a brake, so as to reduce instances of the reel free spinning to dispense strapping 131 when not desired.

The upright 120 extends upwardly from the base 110. The upright 120 supports a bin or tray 105. The tray 105 stores loose tools or loose parts for use in the strapping process. For example, the tray 105 can be used to store metal seals. A horizontal portion or horizontal member 122 of the frame extends outward from the upright 120. The horizontal member 122 extends over top of the base 110. In some forms, the horizontal member 122 extends past the guide 132. As such, a tool 190 can be suspended from the horizontal member 122 over the area into which the strapping 131 is dispensed.

In some forms, the frame 101 includes an additional support 121 coupling the upright 120 to the horizontal portion 122. The support 121 increases the rigidity of the horizontal member 122 and increases the torque that can be safely applied to the joint between the horizontal member 122 and the upright 120.

The horizontal portion 122 includes a connection structure 123 to which a tether 126 can connect to the frame 101. In some forms, the connection structure 123 includes a crossbar or bolt to which a shackle 127 can connect. The illustrated shackle 127 is a threaded link. Other shackles, such as D-shackles, carabiners, hooks, spring clip hooks, may also be used.

The tether 126 is detachably coupled to a tool 190. The tool 190 is a tensioner for tensioning the strapping 131 around an object. The tool 190 has a power source 191. In the illustrated form, the power source 191 is a battery. While the shown tool 190 is a tensioner, it is understood that other strapping tools, such as a metal seal crimper or a cutter for cutting the strapping can also be supported by the tether 126. In some forms, the horizontal member 122 supports a plurality of tethers 126. Each tether 126 supports a strapping tool 190 such that each of the tools needed for a standard strapping operation (e.g., a tensioner and a metal seal crimper) are tethered to the frame 101.

In alternative embodiments, power sources 191 other than the battery are used to power the tool 190. For example, the tether 126 can be used to support corded tools, pneumatic tools, hydraulic tools, and/or hand tools.

The tether 126 includes a reel or spring balancer 125. The spring balancer 125 winds the tether 126 to reduce the length between the connection structure 123 and the tool 190. In operation, tether 126 is unwound from the spring balancer 125 when the tool 190 is in use. When use of the tool 190 is completed, the excess tether 126 is wound up in the spring balancer 125 to store the tool 190 suspended above the base 110.

In some forms, the connection structure 123 is movable relative to the frame 101. The connection structure 123 moves along the length of the horizontal member 122. In operation, the connection structure 123 is in a first position near the distal end of the horizontal member 122 while the tool 190 is in use. The connection structure 123 moves to a second position, closer to the upright 120 than the first position, when the tool 190 is not in use.

Figure 2A:
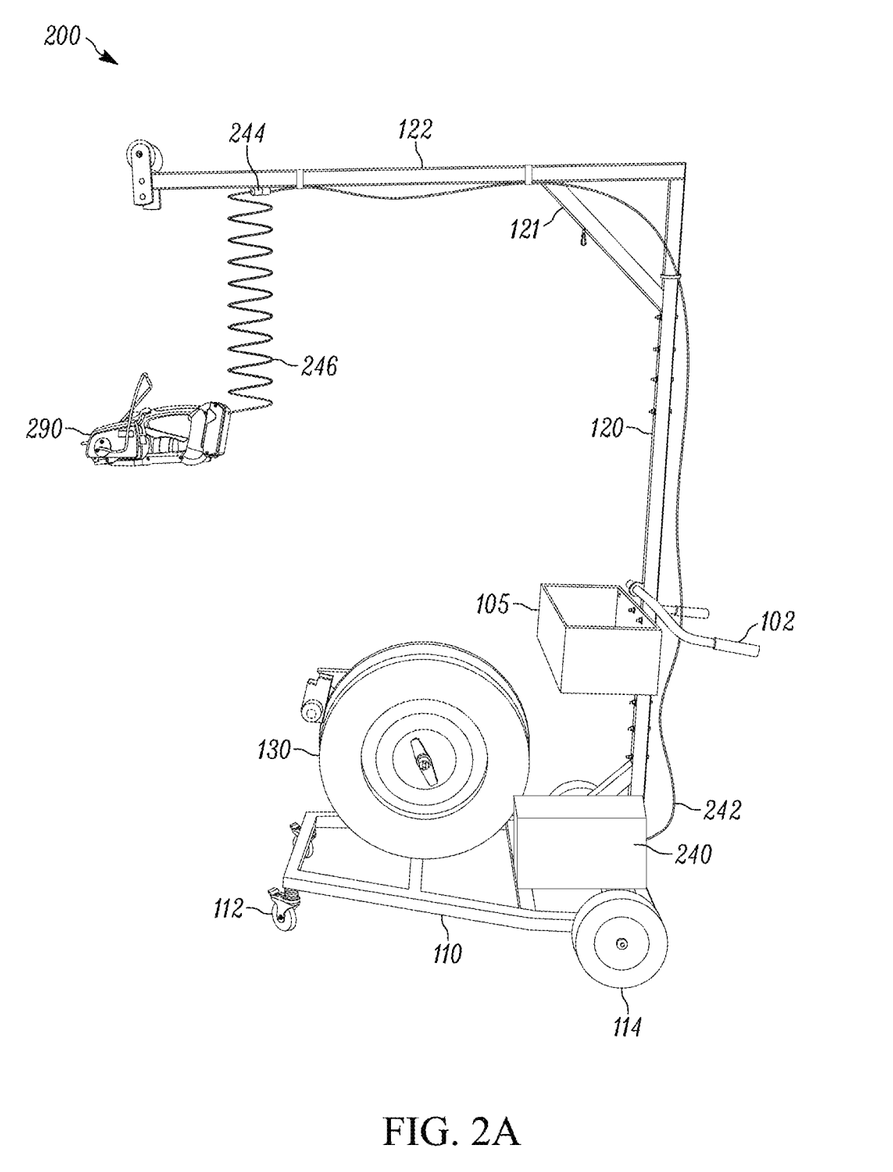
FIG. 2A comprises a side elevational view of a cart with a reel of strapping, a tethered strapping tool, and an air tank in accordance with various embodiments of the invention.
Figure 2B:
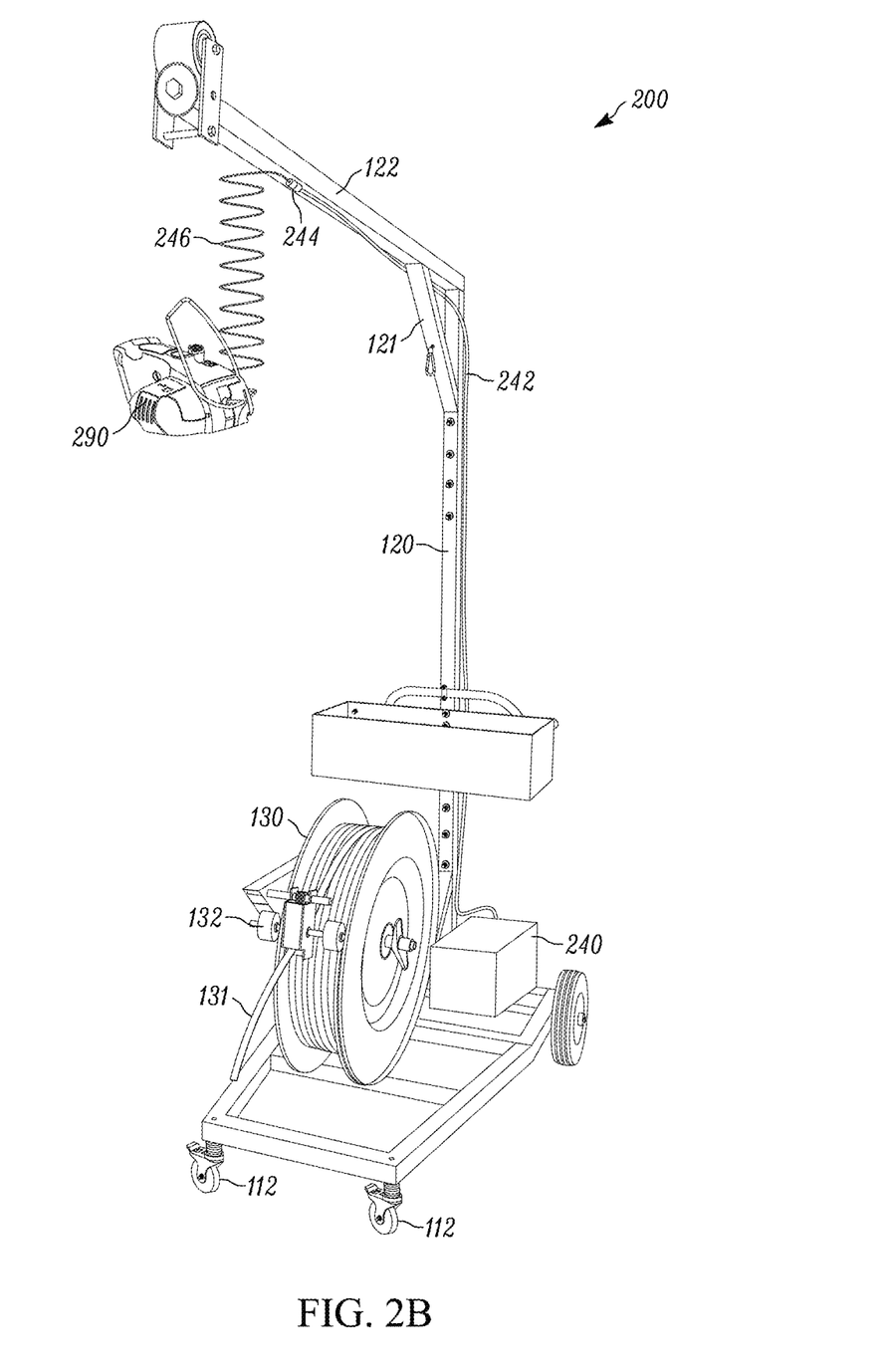
FIG. 2B comprises a front perspective view of the cart of FIG. 2A.
Figure 2C:
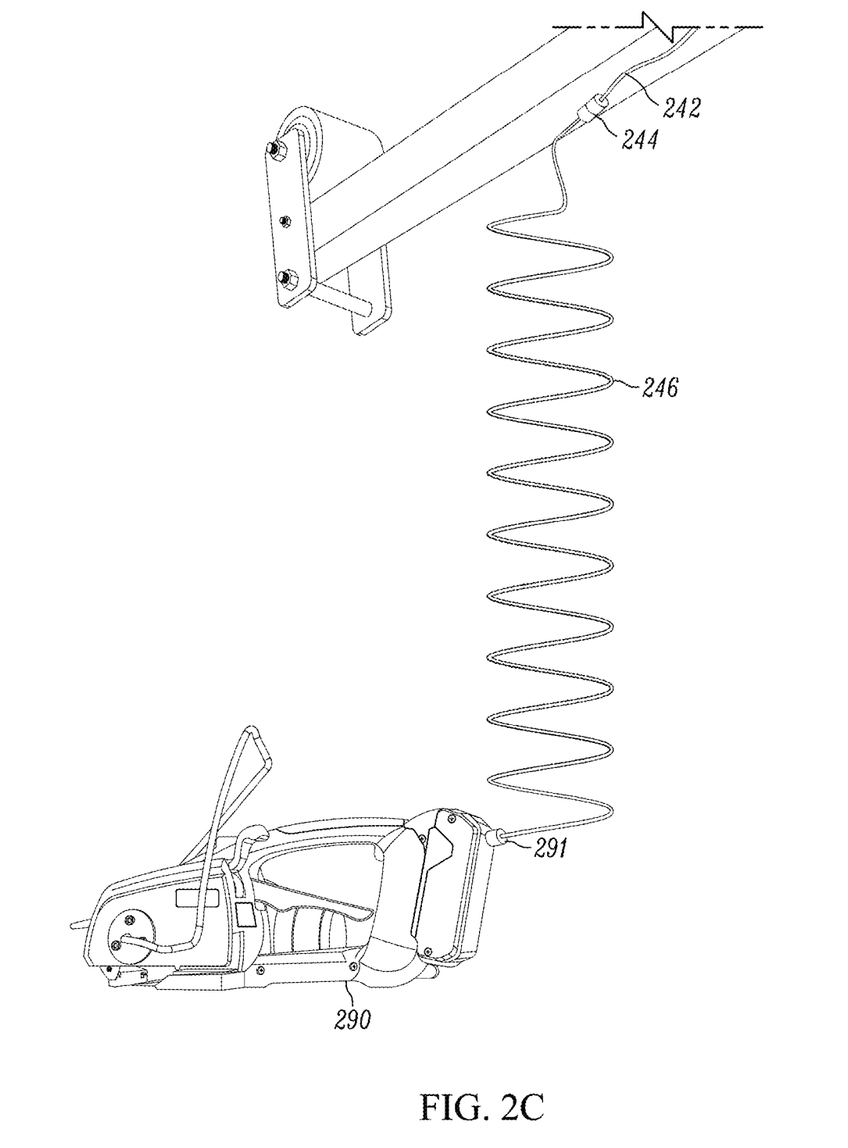
FIG. 2C comprises an expanded view of the tethered strapping tool of FIGS. 2A-2B.

In some forms, the base 110 supports a power source for the tool or tools tethered to the frame 101. As shown in FIGS. 2A-2C, the cart 200 includes an air tank 240. The air tank 240 is supported by the frame 101, or specifically, the base 110.

The frame 101 of the cart 200 is substantially similar to the frame 101 of the cart 100 described above. The frame 101 includes a base portion 110 that supports the air tank 240 and a strapping reel 130. The base 110 is supported by wheels 112/114 so as to be movable between work areas. An upright 120 extends vertically from the base 110. The upright 120 supports the handles 102 and a tray 105. A horizontal member 122 extends outward from the upright 120. The horizontal member 122 supports a tethered tool 290.

An air hose 242 is operatively coupled to the air tank 240. The air hose 242 extends upward along the upright 120 and horizontally along the horizontal member 122. The air hose 242 is secured to both the frame 101 along the upright 120 and the horizontal member 122. The air hose 242 forms fluid communication between the air tank 240 and the tool 290.

In some forms, a second air hose 246 connects the first air hose 242 to the tool 290. In addition to providing compressed air to the pneumatic tool 290, the second air hose 246 serves as a tether to couple the tool 290 to the frame 101. The connection 244, such as a quick connect style air hose connection, serves as the connection point between the tether hose 246 and the frame 101.

The tether hose 246 is a coiled air hose. The coiled air hose 246 stretches when the tool 290 is pulled. The stretching allows a user to move the tool 290 to operate the tool 290 in the strapping process. When the tool 290 is released, the resiliency of the hose 246 causes the hose 246 to contract, pulling the tool 290 closer to the frame 101. Through this resiliency, the hose 246 operates similarly to the spring balancer of the cart 100 by reducing the distance between the tool 290 and the horizontal member 122 when the tool 290 is not in use.

The tool 290 shown is a pneumatic tensioner. It is understood that the tool 290 can be other strapping tools, such as a pneumatic metal seal crimping tool or a pneumatic cutter. In some forms, the tool 290 is an air nozzle used to blow air into the object, so as to create cushioning air pockets within a wrapping material, such as stretch wrap.

In some forms, the cart 200 includes multiple connections 244. A plurality of tether hoses 246 are connected to respective connections 244 for tethering respective tools 290. In other forms, the cart 200 includes one or more tethers 126 separate from the second air hose 246. The separate tether 126 is substantially similar to the tether 126 of FIGS. 1A-1C. The separate tether 126 includes a balancer 125. The tether 126 supports the weight of the tool 290 while the hose 246 provides compressed air thereto. In some forms a plurality of tethers 126 are used to support a plurality of pneumatic tools 290. A single hose 246 is detachably coupled to a single tool 290 at a time. The user switches the hose between pneumatic tools 290 using the quick connect 291 as the tools 290 are used.

In the illustrated form, the air tank 240 is an air compressor. When powered, the air compressor 240 compressed ambient air for use by the pneumatic tool 290. In operation, the air compressor 240 is periodically connected to a power source, such as plugged into a wall outlet, to recharge the air tank. In other forms, the air compressor 240 is battery powered allowing it to recharge when not plugged in. In still further alternatives, the air tank 240 does not include an air compressor. The air tank is periodically connected to a source of compressed air, such as a larger air compressor or air tank, to recharge the tank 240 with compressed air.

Figure 3:
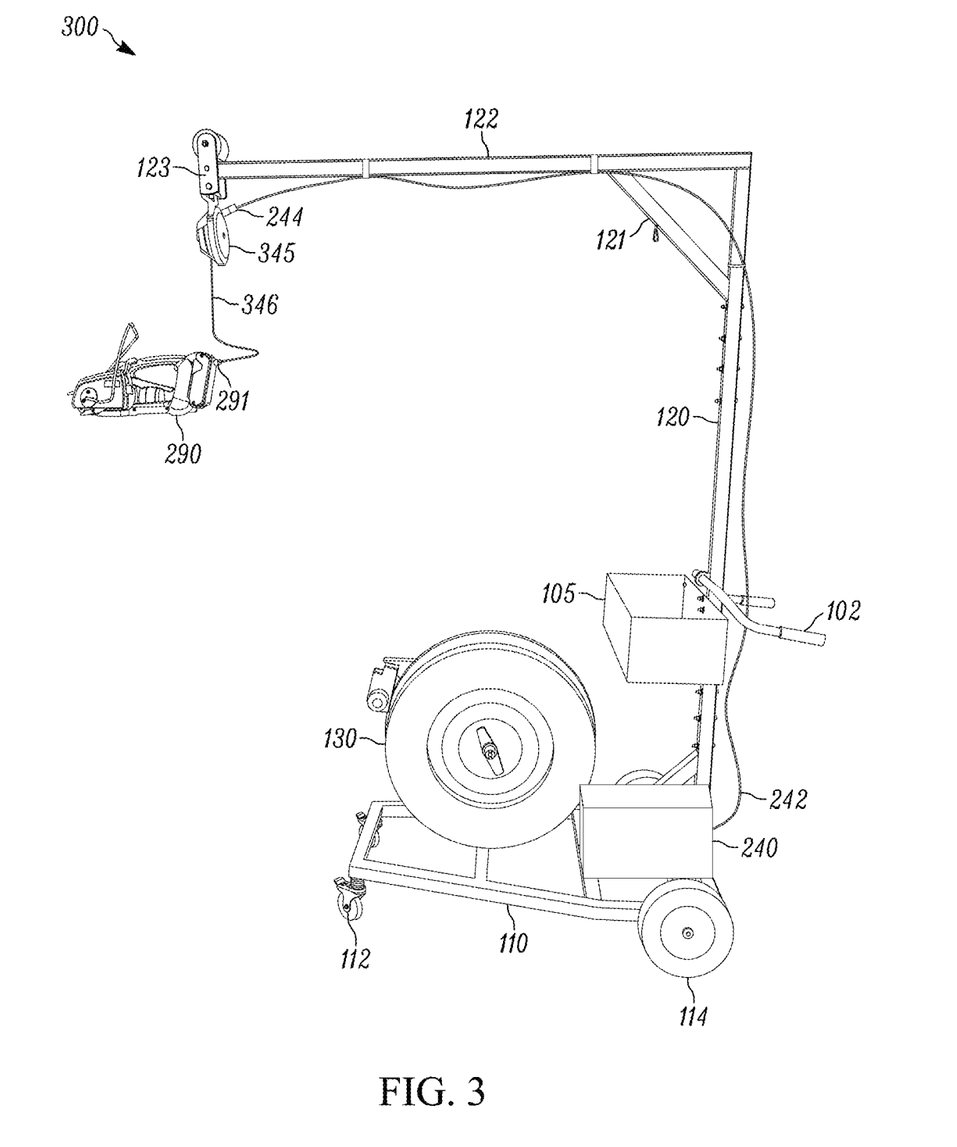
FIG. 3 comprises a side elevational view of a cart with a reel of strapping, a tethered strapping tool, and an air tank in accordance with various embodiments of the invention.

In some forms, the second air hose includes a reel. FIG. 3 illustrates a cart 300 with a reel 345 storing an air hose 346 connected to a pneumatic tool 290. The frame 101 of the cart 300 is substantially similar to the frame 101 of the carts 100 and 200 described above. The frame 101 includes a base portion 110. The base portion 110 has wheels 112/114 such that the cart 300 is movable between work areas. The base portion 110 supports a reel 130 of strapping 131. The base portion 110 further supports an air tank 240.

An upright 120 extends vertically from the base portion 110. The upright 120 supports a horizontal member 122. An air hose 242 connected to the air tank 240 extends along the upright 120 and the horizontal member 122. The air hose 242 is secured to the frame 101.

The air hose 242 is coupled to the second hose 346. The connection 244 connects the air hose 242 to the reel 345. In operation, the hose reel 345 operates similarly to the balancer 125 described above. The reel 345 is spring biased to retract the hose 346. When the user pulls on the tool 290, the reel 345 dispenses hose 346, such that the tool 290 can be operated to strap and object. When the tool 290 is released, the reel 345 winds up the hose 346, reducing the distance between the tool 290 and the connection structure 244.

As shown, the tool 290 is a pneumatic tensioner for tensioning the strapping 131. As described above, the tool 290 can be other tools for use in the strapping process, such as a pneumatic metal seal crimper or a pneumatic cutter.

In some forms, the cart 300 includes a plurality of tools 290. The tools 290 are each coupled to the cart 300 by respective tethers. In some forms, the tethers are a plurality of the hoses 346. In alternative forms, the tethers are a plurality of ropes or cables, such as the tether 126 described above. A single hose 346 is used to power each of the tools 290 connected by the tethers 126.

In each of the embodiments described above, the reel 130 is configured to hold and dispense premade strapping 131. In alternative embodiments, the reel 130 is configured to dispense a different packing material. For example, the reel 130 is configured to dispense stretch wrap or stretch film. In some forms, the stretch film dispenser or reel 130 includes rollers for compressing the stretch film into strapping. A device for processing a roll of stretch film into strapping is described in greater detail in U.S. patent application Ser. No. 15/804,389, filed Nov. 6, 2017 with the title "Stretch Film Processing to Replace Strapping," which application is hereby incorporated by reference in its entirety.

The carts 200 and 300 described above include an air tank 240 for powering pneumatic tools. In alternative embodiments, alternative power sources are used to power the tethered strapping tools. For example, the air tank 240 is replaced with a hydraulic tank. The air hose or air hoses are replaced with hydraulic hoses for forming fluid communication between the tools and the hydraulic tank. In further alternatives, the air tank 240 is replaced by an electric power source, such as at least one battery, capacitor, and/or a generator. The electric power source is operatively coupled to the tool or tools by electrical cords. In some forms, the hydraulic hose or electrical cord serves as a tether for coupling the tool to the frame. In alternative forms, the tool is coupled to the frame by a tether separate from the hydraulic hose or electrical cord.

In each of the embodiments above, the cart includes a horizontal member to which the tool is tethered. In alternative forms, the tool is tethered to a portion of the frame other than the horizontal member. For example, the tool is tethered to the upright or the base. In these forms, the horizontal member may be removed.

Figure 4:
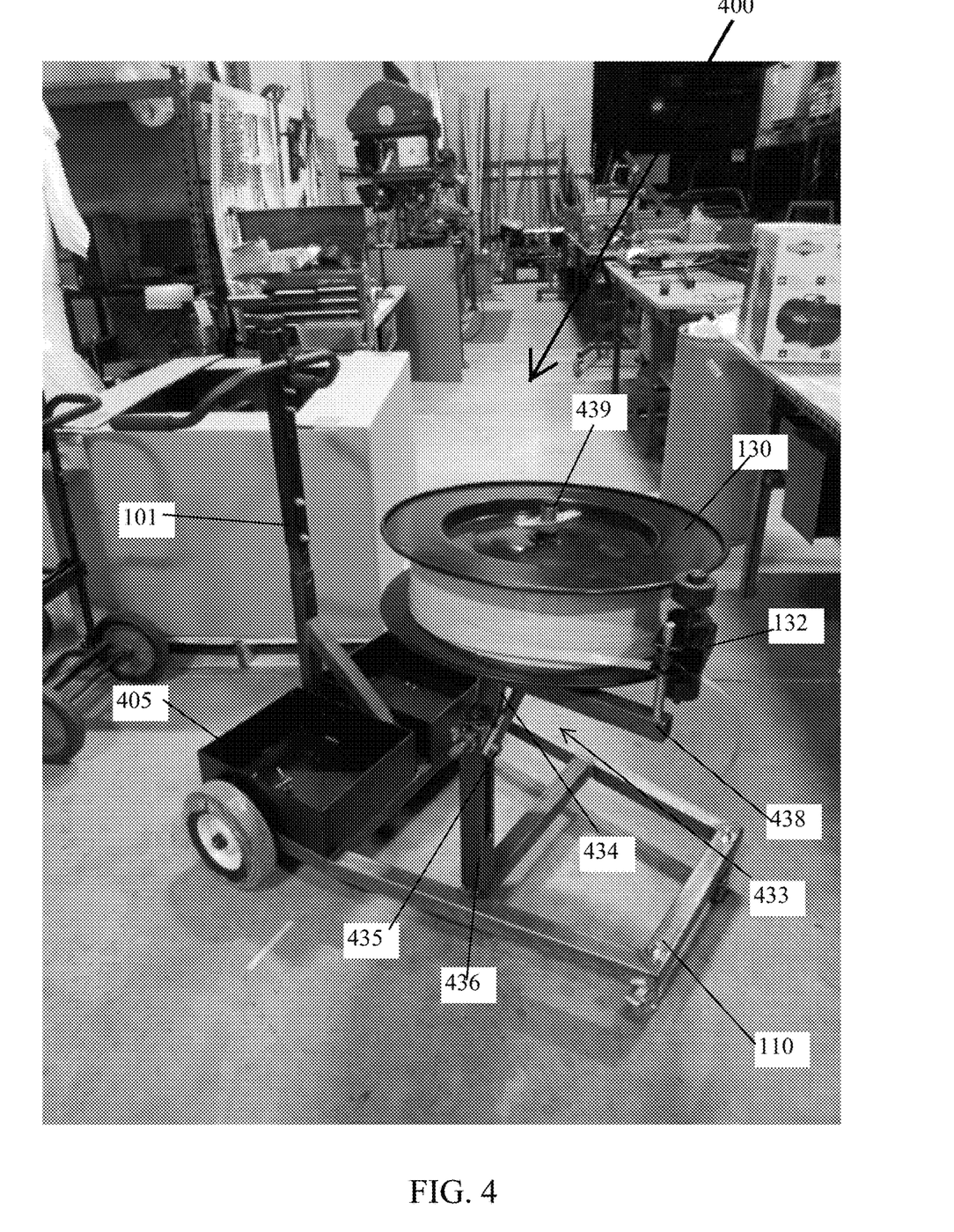
FIG. 4 comprises a side perspective view of a cart having a horizontal mount for a reel of strapping in accordance with various embodiments of the invention.

In some forms, the cart includes a feature configured to aid in loading a new reel 130 of strapping 131. Turning to FIG. 4, the cart 400 includes a movable mount 433 for supporting the reel 130. The horizontal member 122 of the cart 400 has been removed to more clearly show the mount 433. It is understood that the cart 400 is configured to include a horizontal member 122 and balancer 125 as in the embodiments described above. The mount 433 is movable from a first, dispensing position with the reel 130 being vertical as shown in FIG. 1A, to a second, loading position with the reel 130 being horizontal as shown in FIG. 4. The mount 433 is formed of a movable portion 434 movably coupled to a stationary portion 436. The movable portion 434 includes a support member 438 for supporting the reel 130. The movable portion further includes a shaft onto which the reel 130 is secured by the securing member 439. In some forms, the shaft is threaded, and the securing member 439 is a nut configured to threadingly engage the shaft.

The stationary portion 436 includes an upright or support post extending upwardly from the base portion 110 of the frame 101. In some forms, the movable portion 434 is pivotably coupled to the stationary portion 436 by the hinge member 435. The movable portion 434 pivots about the hinge member 435 between the first and second positions. The mount 433 includes a stop for releasably securing the movable portion 434 in the second position, so that the reel 130 can be changed.

In some embodiments, the mount 433 includes a drive system for moving the movable portion from the first position to the second position. In some forms, the drive system can be powered, such as electric, pneumatic, or hydraulic. In alternative forms, the drive system is manually actuated. In one form, the drive system includes a worm drive where the movable portion 434 is coupled to the worm wheel of the worm drive. In this approach, rotation of the worm shaft causes the worm wheel, and therefore the movable portion 434, to pivot. In some forms, the worm shaft is driven by a motor, such as an electric motor. Alternatively, the worm shaft is coupled to a crank such that it can be manually rotated. In still further forms, the worm shaft has a portion configured to detachably couple to a removable tool, such as a wrench, ratchet, or drill, to aid in the actuation of the drive system. The worm drive doubles as the stop as it resists back driving.

Alternatively or additionally, the mount 433 is configured to move the movable portion vertically between a raised, dispensing position and a lowered, loading position. In the lowered position, the support member 438 is proximate the base portion 110 of the frame 101 such that the reel 130 can be mounted with minimal lifting.

In operation, the movable portion 434 is moved to the second, loading position when the reel 130 needs changed, such as when the reel 130 is empty or when a different sized strapping 131 is desired. With the movable portion 434 in the second position, the securing member 439 is removed, allowing the reel 130 to also be removed. The replacement reel 130 is placed on the support member 438 with the shaft extending through the center of the reel 130. The support member 438 supports the reel 130 while the securing member 439 is used to secure the reel 130 in place. Once the reel 130 is secured, the movable portion 434 is returned to the first, dispensing position.

Figure 6:
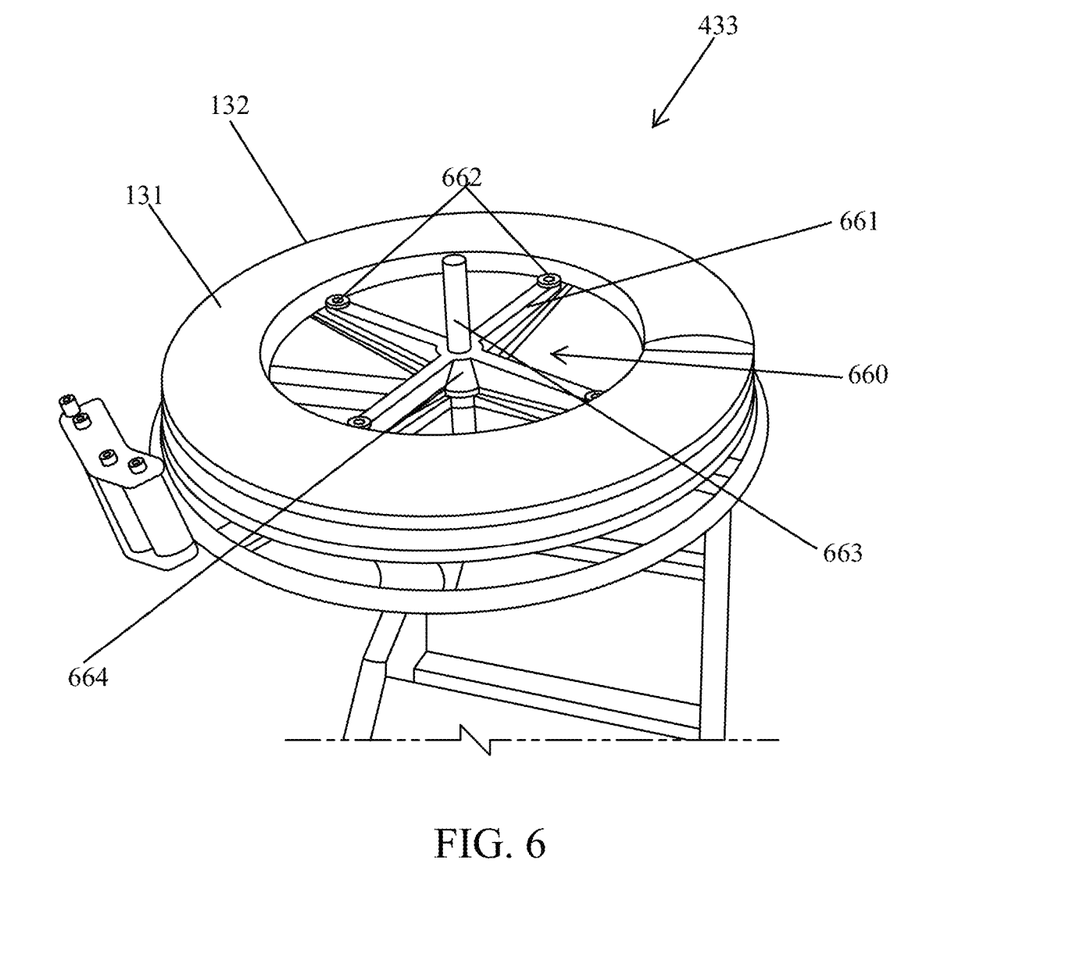
FIG. 6 is a front perspective view illustrating a mount for the cart of FIG. 4 in isolation, the mount is in the loading position.

In some embodiments, a roll 132 of strapping 131 is replaced with the reel remaining part of the mount 433. As shown in FIG. 6, the movable portion 434 of the mount 433 is in the second, loading position. The securing member 439 along with one wall of the reel 130 is removed to allow access to a roll 132 of strapping 131.

The mount 433 includes a center support 660 with a plurality of arms 661. Each arm 661 has an engagement member 662, such as a roller or bearing, for engaging the inner surface of the roll 132. The engagement member 662 is movable in a radial direction relative to the shaft 663. In some forms, the engagement member 662 is movable relative to the arm 661. In alternative embodiments, the entire arm 661 is movable. In one form, the central hub 664 of the support 660 is movable along the length of the shaft 663. Each arm 661 is pivotably coupled to the central hub 664. Moving the central hub 664 upward along the shaft 663 causes the arms 661 to pivot inward, moving the engagement members 662 out of engagement with the roll 132. With the engagement members 662 out of engagement, the roll 132 can be replaced.

The adjustable engagement members 662 enable the mount 433 to be loaded with a deformed roll 132. If a roll 132 has become deformed such that it is no longer circular, for example the roll is elliptical, the engagement members 662 are adjusted inward to fit within the central opening of the roll 132. Tightening the engagement member 662 outward then forces the roll 132 back into a substantially circular shape.

In some forms, the engagement members 662 are manually adjustable, such as by tightening and loosening a nut on the shaft 663. In alternative embodiments, the engagement members 662 are electrically or pneumatically adjustable, such as by the use of electrical or pneumatic actuators within the arms 661. In the illustrated form, the support 660 has 4 arms. It is understood that more or less arms can be used. In a preferred form, the support 660 has at least 3 arms 661.

The cart 400 further includes one or more trays or bins 405. The bins 405 are mounted to the base portion 110 of the frame 101. The bins 405 provide storage on the cart 400 for items used to apply the strapping 131, such as tools or clips. The bins 405 are in addition to or in place of the tray 105 described above.

Figure 5:
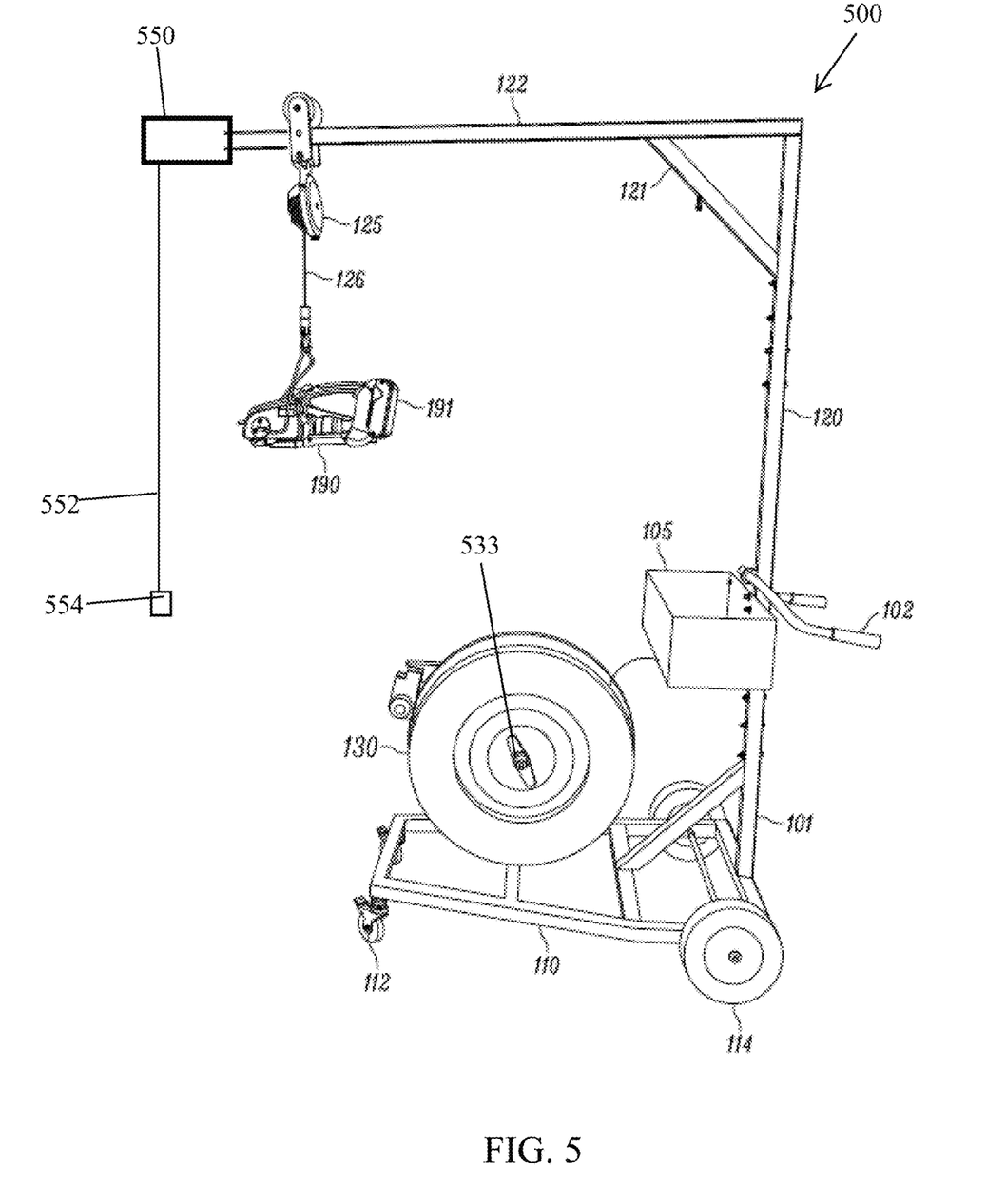
FIG. 5 comprises a side elevational view of a cart with a reel of strapping, a tethered strapping tool, and a hoist in accordance with various embodiments of the invention.

Alternatively or additionally, the carts disclosed herein include a hoist to aid in lifting of reels 130. FIG. 5 illustrates a cart 500 with a hoist 550 coupled to the horizontal portion 122 of the frame 101. In some forms, the hoist 550 is movable along the length of the horizontal member 122.

The hoist includes a rope or cable 552 with a free end extending downward from the hoist 500. The cable 552 is wound up about a reel within the hoist 550. In operation, the reel is rotated to extend or retract the cable 552. The hoist 550 shown is powered. A motor, such as an electric motor, is configured to rotate the reel so as to cause the cable 552 to extend and retract. The motor is powered by a power source, such as a battery or electrical cord configured to plug into a standard electrical outlet. In some forms, the hoist 550 is electrically coupled to a shared power source, such as a battery, with the tool 190 and/or air compressor 240. In alternative forms, the reel is configured to be manually rotated.

The cable 552 includes a coupling member 554, such as a hook, for detachably coupling the cable 552 to an object to be lifted. In operation, the cable 552 is extended such that the coupling member 554 can be coupled to a reel 130. The cable 552 is then retracted to lift the reel 130 off of the ground. The hoist 550 is moved along the horizontal portion 122 toward the vertical portion 120 until the cable 552 is aligned over the mount 533. The reel 130 is then coupled to the mount 533 and decoupled form the cable 552.

In operation, the hoist 550 is also used to lift and/or manipulate the objects being strapped by the strapping 131. In one example, the hoist 550 is used to lift a heavy object onto a pallet. The strapping 131 is then wrapped around the object and the pallet and used to secure the object to the pallet with the tool 190.

In some forms, the frame 101 is used as a hoist 550. The horizontal portion 122 is pivotably coupled to the vertical portion 120. A jack or piston, such as a hydraulic piston is configured to cause the horizontal portion 122 to pivot. In operation, the horizontal portion 122 is pivoted downward such that a cable or chain coupled thereto is attached to a reel 130. The horizontal portion 122 is then jacked upward by the hydraulic piston, lifting the reel 130 off of the ground. The cable is moved along the length of the horizontal portion 122 to align with the mount 533, so that the reel 130 can be coupled to the mount 533.

Those skilled in the art will recognize that a wide variety of modifications, alterations, and combinations can be made with respect to the above described embodiments without departing from the scope of the invention. For instance, any of the above aspects can be applied to a known carts or strapping reels alone or in any combination to improve different aspects of the carts performance.

Those skilled in the art will further recognize that the exemplary embodiments shown above are intended to illustrate various features, such as exemplary tethers or power sources. It is understood that the specific embodiments are not limiting and that a person of ordinary skill would be enabled to combine features from multiple embodiments. For example, a cart is considered herein having the tether of the cart 100 and the air tank of the carts 200 or 300. Alternatively or additionally, a single cart may include two or more of the hoist of the cart 500, movable mount of the cart 400, and air tank of the carts 200 or 300. In still further examples, a single cart is provided supporting both a pneumatic tool and a non-pneumatic tool, such as a battery powered tool or hand powered tool.

It is further understood that the description of the various carts above is sufficient to describe related methods. For example, methods of making and using the carts, or a method of strapping objects or storing tools using the carts is described above are considered herein. Such modifications, alterations, and combinations are to be viewed as being within the ambit of the inventive concept.

What is claimed is:

1. A cart comprising:
a support frame having a plurality of wheels;
a reel mount mounted to the support frame and configured to support a reel; and
a tethering device supported by the support frame and configured to support a tool, the tethering device comprising a first spring balancer configured to tether the tool to the support frame.

2. The cart of claim 1 further comprising a power source supported by the frame.

3. The cart of claim 2, wherein the power source comprises an air tank.

4. The cart of claim 3, further comprising an air compressor configured to pressurize the air tank.

5. The cart of claim 3 further comprising at least one air hose operatively coupling the tool to the air tank.

6. The cart of claim 5, wherein the at least one air hose tethers the tool to the support frame.

7. The cart of claim 1, wherein the reel comprises a reel of strapping.

8. The cart of claim 1, wherein the tool comprises a strapping tool.

9. The cart of claim 8, wherein the tool is at least one tool selected from a list comprising a tensioner, a crimper, and a cutter.

10. The cart of claim 1, the support frame comprising:
a base; and
an upright extending vertically from the base.

11. The cart of claim 10, wherein the reel mount is supported by the base.

12. The cart of claim 10, the support frame further comprising a horizontal member extending from the upright.

13. The cart of claim 12, wherein the tool is tethered to the horizontal member.

14. The cart of claim 1, the frame including a connection structure configured to couple a tether to the support frame.

15. The cart of claim 14, wherein the connection structure is substantially above the reel.

16. The cart of claim 1, wherein at least one of the plurality of wheels is a swivel caster.

17. The cart of claim 1 further comprising a second tool tethered to the support frame.

18. The cart of claim 17 wherein the tool is a tensioner and the second tool is a crimper.

19. The cart of claim 17 further comprising a second spring balancer, the first spring balancer and second spring balancer coupled to respective ones of the tool and the second tool.

20. The cart of claim 1, the support frame comprising:
a stationary portion; and
a movable portion movable relative to the stationary portion from a first position to a second position.

21. The cart of claim 20, wherein the movable portion is pivotably coupled to the stationary portion.

22. The cart of claim 1 further comprising a hoist.

23. A method of using a cart comprising a support frame having a plurality of wheels, a reel supported by the support frame, and a tool tethered to the support frame, the method comprising:
removing strapping from the reel;
wrapping the strapping around an object;
unwinding a tether coupling the tool to the support frame from a spring balancer; and
securing the strapping with the tool.

24. The method of claim 23, wherein the securing the strapping with the tool comprises tensioning the strapping with the tool.

25. The method of claim 23, wherein the securing the strapping with the tool comprises crimping a metal seal onto the strapping with the tool.

26. The method of claim 23 further comprising charging an air tank supported by the frame, the air tank being operatively coupled to the tool.

27. The method of claim 26 wherein the charging the air tank comprises connecting an air compressor of the air tank to a power source.

28. The method of claim 26 wherein the charging the air tank comprises connecting the air tank to a compressed air supply.

29. A cart comprising:
a support frame comprising:
a base having a plurality of wheels;
an upright extending upward from the base;
a horizontal member extending from the upright, the horizontal member extending at least partially above the base;
a reel mount supported by the support frame and movable between a first position in which a reel supported by the reel mount is substantially vertical and a second position in which the reel is substantially horizontal, the reel mount configured to support a reel;
a drive mechanism configured to move the reel mount between the first position and the second position; and
a tethering device supported by the horizontal member and configured to support a tool, wherein the tethering device is movably supported by the horizontal member to be movable along the horizontal member.

30. The cart of claim 29 wherein the drive mechanism includes a motor.

31. The cart of claim 29 further including a power source operably coupled to the tool.

32. The cart of claim 31 wherein the power source includes a tank of compressed air.

33. The cart of claim 29 further comprising the reel, wherein the reel comprises:
a central shaft;
a plurality of arms extending outward from the central shaft;
a plurality of engagement members, each engagement member coupled to a corresponding one of the plurality of arms,
wherein the plurality of engagement members are adjustable relative to the shaft.

* * * * *